(12) United States Patent
Flanagan (10) Patent No.: US 11,084,411 B2
(45) Date of Patent: Aug. 10, 2021

(54) MODULAR CARGO SLIDER

(71) Applicant: Jim Flanagan, Justin, TX (US)

(72) Inventor: Jim Flanagan, Justin, TX (US)

( * ) Notice: Subject to any disclaimer, the term of this patent is extended or adjusted under 35 U.S.C. 154(b) by 0 days.

(21) Appl. No.: 16/858,656

(22) Filed: Apr. 26, 2020

(65) Prior Publication Data

US 2020/0331380 A1 Oct. 22, 2020

Related U.S. Application Data

(60) Provisional application No. 62/836,026, filed on Apr. 18, 2019.

(51) Int. Cl.
| | |
|---|---|
| *B60R 9/06* | (2006.01) |
| *B60P 7/08* | (2006.01) |
| *B60P 1/64* | (2006.01) |
| *B60P 1/00* | (2006.01) |
| *B60R 11/00* | (2006.01) |

(52) U.S. Cl.
CPC ............. *B60P 1/6427* (2013.01); *B60P 1/003* (2013.01); *B60P 1/6409* (2013.01); *B60R 7/0892* (2013.01); *B60R 2011/0082* (2013.01); *B60R 2011/0084* (2013.01); *B60R 2011/0085* (2013.01)

(58) Field of Classification Search
CPC .. B60P 7/0892; B60R 9/06; B60R 2011/0084; B60R 2011/0085
See application file for complete search history.

(56) References Cited

U.S. PATENT DOCUMENTS

| | | | | |
|---|---|---|---|---|
| 2,898,146 | A | * | 8/1959 | Yudenfreund .......... B60R 13/01 296/39.1 |
| 3,613,931 | A | * | 10/1971 | Schifferle ................ B65D 9/12 217/12 R |
| 3,718,943 | A | * | 3/1973 | Bustin ....................... E05D 1/04 16/355 |
| 3,746,203 | A | * | 7/1973 | Cipolla .................... B65D 7/26 220/6 |
| 3,902,291 | A | * | 9/1975 | Zucht ..................... G09B 25/04 52/284 |
| 4,189,056 | A | * | 2/1980 | Majewski ................. B60R 7/02 211/195 |
| 4,358,035 | A | * | 11/1982 | Heidecker ................ B60R 7/02 220/533 |
| 4,538,737 | A | * | 9/1985 | Delaney ................ B60P 7/0892 206/560 |
| 4,824,162 | A | * | 4/1989 | Geisler .................... B60J 7/041 16/269 |

(Continued)

*Primary Examiner* — Brian D Nash
(74) *Attorney, Agent, or Firm* — Johan Eide; Christopher Pilling; My Patent Guys (57) ABSTRACT

The present invention relates to a modular cargo slider for easy modular assembly of at least one platform and custom configuration by the user. Optional dividers allow for the containment of a cargo on a top surface of the platform during transport and can be optionally adjoined to at least one platform, an end cap or a spacer as needed by the user. In some embodiments, the dividers include at least one indentation for assisting the user in securing the cargo on top of the top surface of the platform of at least one platform. In some embodiments, at least one end cap and at least one spacer allow for further custom configurations be the user.

12 Claims, 9 Drawing Sheets

(56) References Cited

U.S. PATENT DOCUMENTS

| | | | | |
|---|---|---|---|---|
| 5,161,700 A * | 11/1992 | Stannis | B60R 7/02 | 211/175 |
| 5,186,510 A * | 2/1993 | Stapp | B60R 9/00 | 190/107 |
| 5,205,602 A * | 4/1993 | Hoare | B60R 7/02 | 248/503 |
| 5,469,999 A * | 11/1995 | Phirippidis | B60P 5/04 | 220/23.4 |
| 5,526,972 A * | 6/1996 | Frazier | B60R 9/00 | 224/539 |
| 5,597,193 A * | 1/1997 | Conner | B60P 7/0892 | 224/404 |
| 5,853,116 A * | 12/1998 | Schreiner | B60R 9/00 | 224/404 |
| 6,056,177 A * | 5/2000 | Schneider | B60R 5/04 | 220/4.28 |
| D450,291 S * | 11/2001 | Wang | D12/426 | |
| 6,401,995 B1 * | 6/2002 | Yuille | B60R 7/02 | 220/483 |
| 6,478,356 B1 * | 11/2002 | Wayne | B60R 11/06 | 296/39.2 |
| 6,676,182 B2 * | 1/2004 | Fitts | B60P 3/40 | 224/403 |
| 7,273,336 B2 * | 9/2007 | Silamianos | B60P 7/14 | 410/129 |
| 7,530,618 B2 * | 5/2009 | Collins | B60P 1/003 | 224/403 |
| 7,555,816 B2 * | 7/2009 | Walker | B60P 3/14 | 16/355 |
| 7,607,692 B2 * | 10/2009 | Adams | B62D 49/0628 | 220/495.01 |
| 8,029,219 B2 * | 10/2011 | Toutant | B61D 45/006 | 410/129 |
| 8,167,387 B1 * | 5/2012 | Quinn | A47B 43/00 | 312/258 |
| 8,317,442 B2 * | 11/2012 | Daikuzono | B60P 7/0892 | 410/140 |
| 8,430,714 B2 * | 4/2013 | Benincasa | A01K 47/00 | 449/30 |
| 9,067,521 B1 * | 6/2015 | Masanek, Jr. | B60P 7/0892 | |
| 9,107,497 B1 * | 8/2015 | Al-Habsi | A47B 65/10 | |
| 9,132,785 B2 * | 9/2015 | Roach | B60P 7/0892 | |
| 9,132,786 B2 * | 9/2015 | Roach | B60P 7/0892 | |
| 9,168,874 B2 * | 10/2015 | Smith | B60R 9/00 | |
| 9,695,590 B2 * | 7/2017 | Amend | B29C 65/02 | |
| 10,196,008 B2 * | 2/2019 | Ranka | B60R 11/06 | |
| 10,227,047 B2 * | 3/2019 | Purvis | B65D 71/72 | |
| 10,557,275 B2 * | 2/2020 | Lescord | E04G 1/36 | |
| 10,737,609 B2 * | 8/2020 | Stanesic | B60P 7/14 | |
| 2002/0145022 A1 * | 10/2002 | Nguyen | B60R 7/02 | 224/539 |
| 2010/0264180 A1 * | 10/2010 | Allotey | B60R 11/06 | 224/404 |
| 2016/0193800 A1 * | 7/2016 | Skinner | B29C 66/727 | 493/340 |
| 2016/0214522 A1 * | 7/2016 | Marshall | B60P 7/0884 | |
| 2020/0164781 A1 * | 5/2020 | Pascarella | B62D 33/0273 | |

* cited by examiner

MODULAR CARGO SLIDER

RELATED APPLICATION

This application claims priority to provisional patent application U.S. Ser. No. 62/836,026 filed on Apr. 18, 2019.

BACKGROUND

1. Field of the Invention

The present invention relates to a modular cargo slider for moving cargo in and out of a vehicle.

2. Description of Related Art

Traditionally, loading items and cargo into or out of a vehicle is cumbersome process and commonly items fall out of the reach of a human arm span. Items such as groceries, tools, or packages commonly tip over, slide, or roll in a storage compartment of a vehicle during transport from one location to another. Any movement of items within a vehicle can result in damage to the item or damage to the inside of a vehicle. Furthermore, the storage compartment on many vehicles available for commercial purchase extends farther into the inside of a vehicle than the arm span or reach of a human. An improved solution is needed for moving cargo in and out of a vehicle quickly, protecting both the vehicle and the cargo from damage during transport, and a solution for allowing the user to not have to climb into the storage compartment of a vehicle when cargo is beyond the reach of the user.

Commercially available sliding storage accessories for vehicles often commonly comprise mounting hardware that is damaging and intrusive to the interior of the vehicle. For example, many commercially available sliding storage accessories require the sliding element or platform to be fastened to the frame of the vehicle. Additionally, available sliding storage accessories are most commonly adapted for use with a specific size of storage compartment for a specific model of vehicle. A solution for cargo transport and access is needed for allowing the user to configure a slider for multiple vehicles or to match the size of the cargo to be transported. Lastly, commercially available cargo sliders are commonly made of a singular top panel sized to fit the storage compartment of a specific model of vehicle and do not offer vertical support or containment for items or cargo from moving on top of the slider. Consequently, a sliding element is needed having a configurable size and additional support for items moving on top of the sliding element during transportation.

SUMMARY

The present invention solves the problems presented above by providing a modular cargo slider for easy modular assembly of at least one platform and custom configuration by the user. Optional dividers allow for the containment of cargo on a top surface of a platform during transportation and can be optionally adjoined to at least one platform, at least one end cap, or at least one spacer, as needed by the user. In some embodiments, the optional dividers include at least one indentation for assisting the user in securing the cargo on the top surface of the platform. In some embodiments, at least one end cap and at least one spacer allow for further custom configurations of the modular cargo slider by the user.

One object of the current invention is to allow for the modular cargo slider to be configurable to match a storage compartment of multiple vehicles.

Another object of the current invention is to provide containment means for items held upon a top surface of a platform of the modular cargo slider. The containment means also being configurable by the user of the modular cargo slider and being used for retaining items from moving on top of the platform of the slider.

Another object of the current invention is to provide a system wherein no mounting hardware is required by the user to adjoin the modular cargo slider to a vehicle.

Another object of the current invention, in some embodiments, is to allow for the modular cargo slider to fold out of the way of the user when the modular cargo slider is moved out of a vehicle, and wherein no items currently rest upon the top surface of the platform.

In order to do so, a modular cargo slider is provided having at least one platform having a bottom surface configured to slide along a surface of the vehicle. In some embodiments, at least one slot is joined to the top surface of the at least one platform and at least one divider is configured to slide into the at least one platform slot. The at least one divider aides in containing the cargo on the top surface of the platform. In some embodiments, at least one first connection member is joined to the platform perimeter edge and at least one second connection member joined to a perimeter edge of the platform. The second connection member is configured to join to the first connection member and allows for rotation of the at least one platform about the first connection member. The modular cargo slider may also contain at least one cavity extending into the perimeter edge of the platform. At least one cavity is configured to receive at least one end cap. The at least one end cap having at least one spacer configured to adjust the use and size of the modular cargo slider as desired by the user. Some embodiments of the modular cargo slider aide the user in pulling or pushing the modular cargo slider into or out of the storage compartment of a vehicle by utilizing at least one handle joined to the top surface of the platform.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Figure 1:
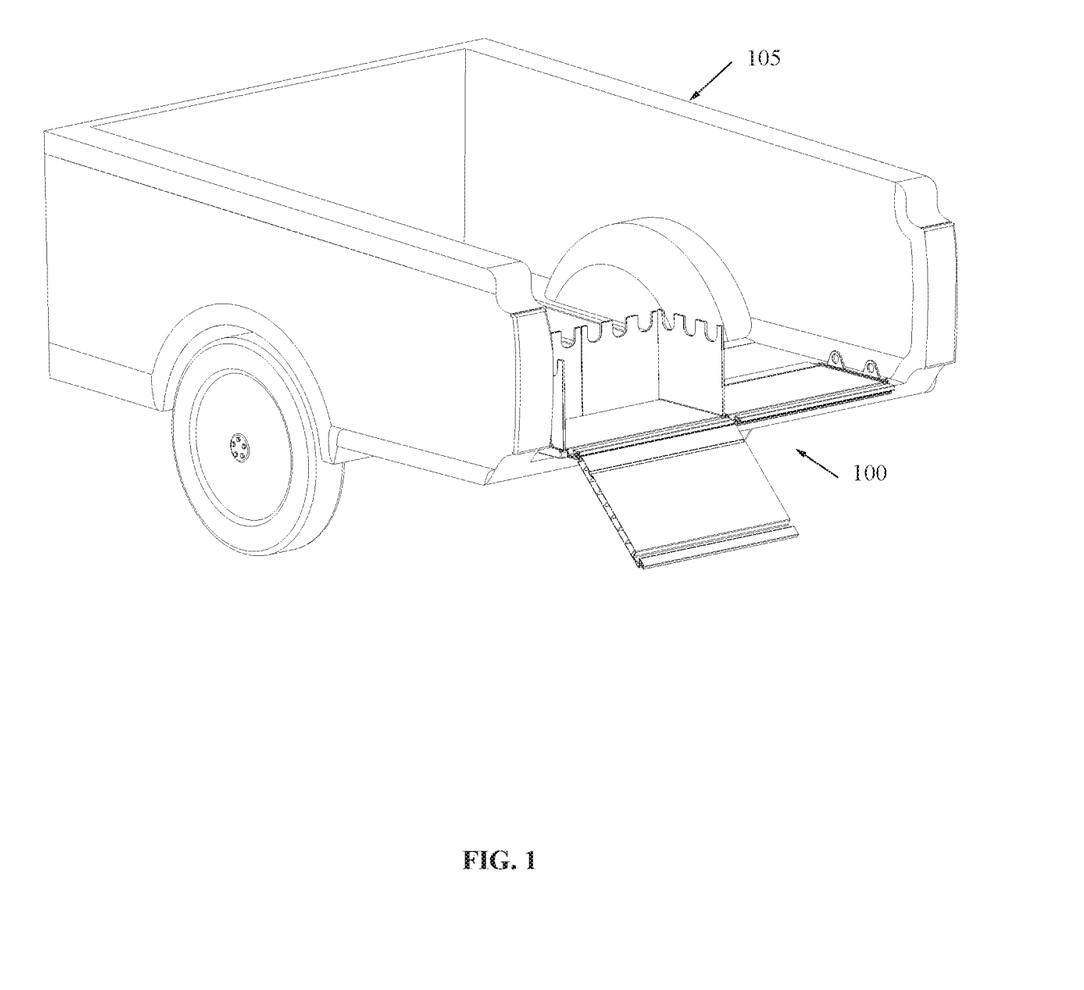
FIG. 1 shows an exemplary isometric view of one embodiment of the modular cargo slider resting upon an exemplary storage compartment of a vehicle.
Figure 2:
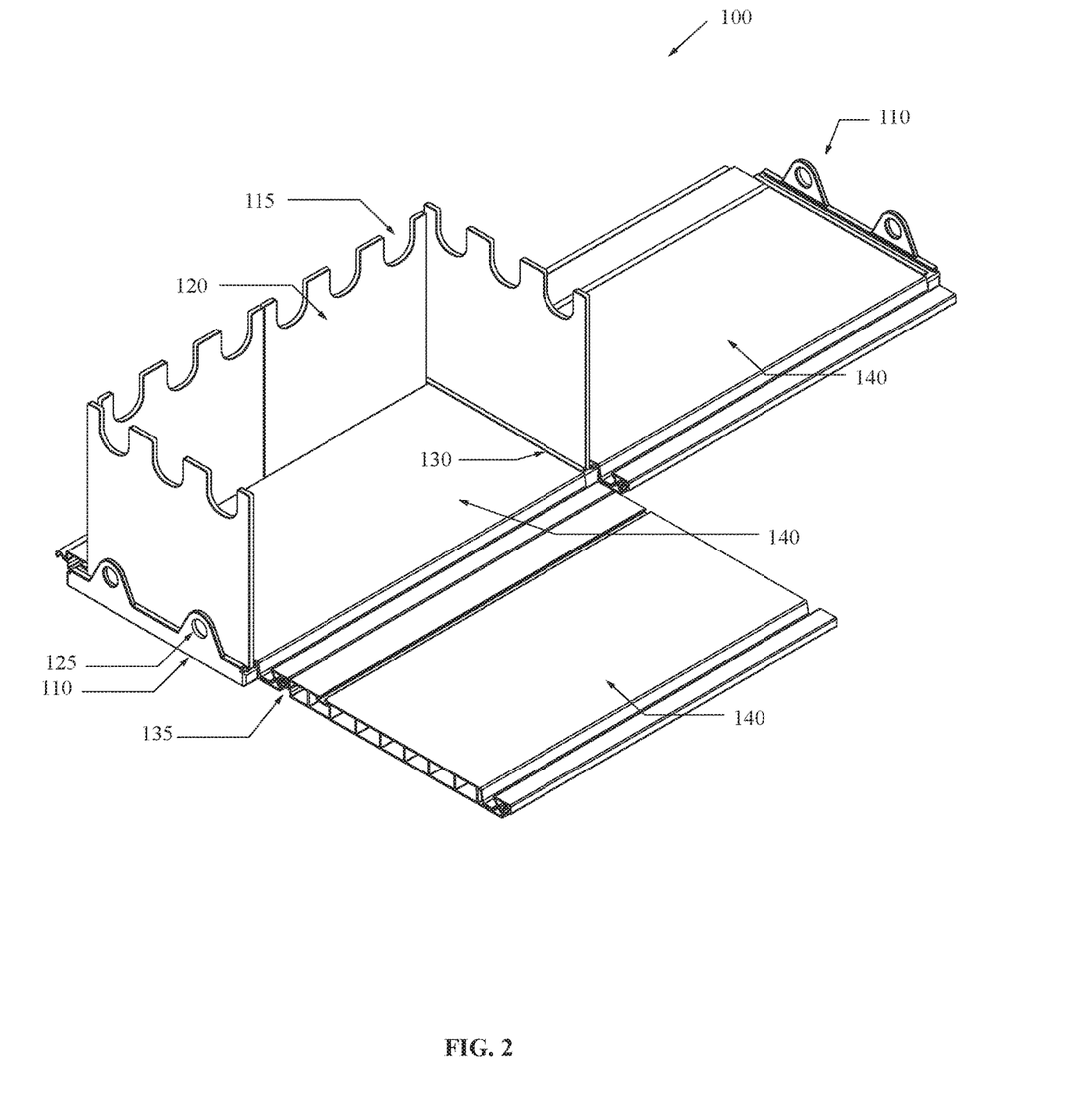
FIG. 2 shows an exemplary isometric view of one embodiment of the modular cargo slider.
Figure 6A:
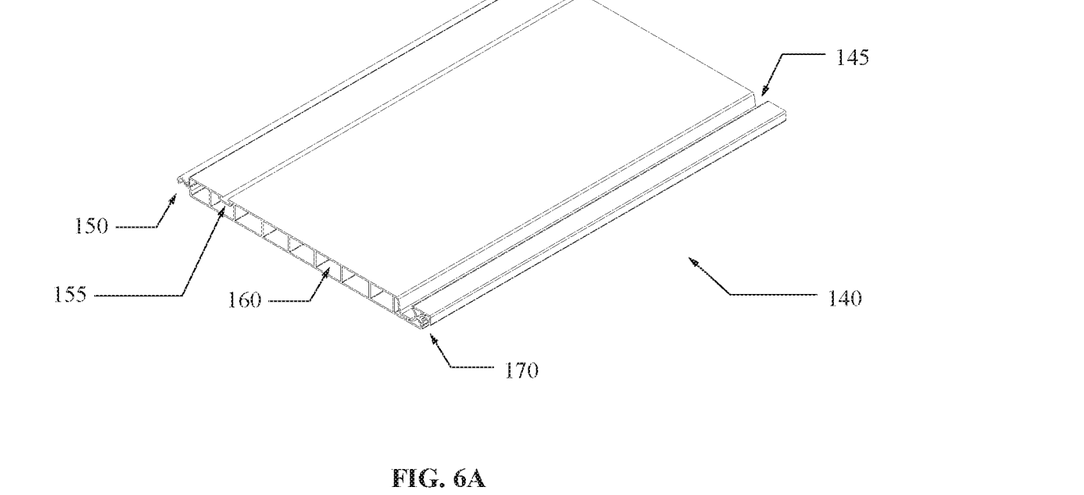
FIG. 6A shows an exemplary isometric view of one embodiment of the platform of the modular cargo slider.
Figure 6B:
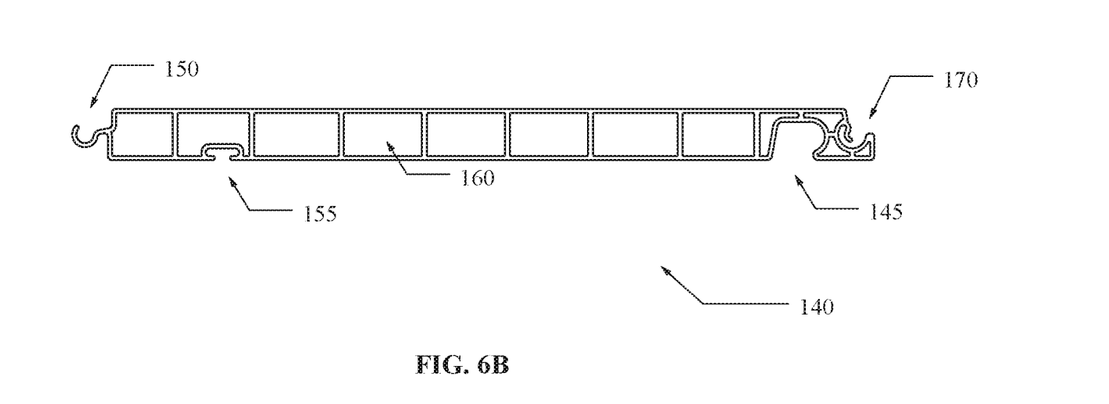
FIG. 6B shows an exemplary right view of one embodiment of the platform of the modular cargo slider.

FIG. 1 and FIG. 2 illustrate an exemplary embodiment of a modular cargo slider 100 from isometric perspective views. The modular cargo slider comprises a platform 140 having a top surface, a bottom surface, and a perimeter edge. The bottom surface is configured to slide along a surface of a vehicle 105. The modular cargo slider may be configured to adapt to different sizes of a storage compartment of the vehicle. In some embodiments, the modular cargo slider comprises multiple platforms. Best seen in FIGS. 6A and 6B, in some embodiments, the platform includes a first connection member 150 and a second connection member 170 joined to the perimeter edge. In some embodiments, the first connection member protrudes into the perimeter edge. In some embodiments, the first connection member extends above the perimeter edge. In some embodiments, the second connection member protrudes into the perimeter edge. In some embodiments, the second connection member extends above the perimeter edge. The first connection member is joined to the second connection member at a connection point 135 in embodiments of the modular cargo slider having multiple platforms. In some embodiments, at least one second connection member is configured to join to at least one first connection member and therein allows for a rotation of the at least one platform about at least one first connection member, i.e. multiple platforms are configured to rotate about each other when connected. This will be discussed in greater detail below.

Figure 3:
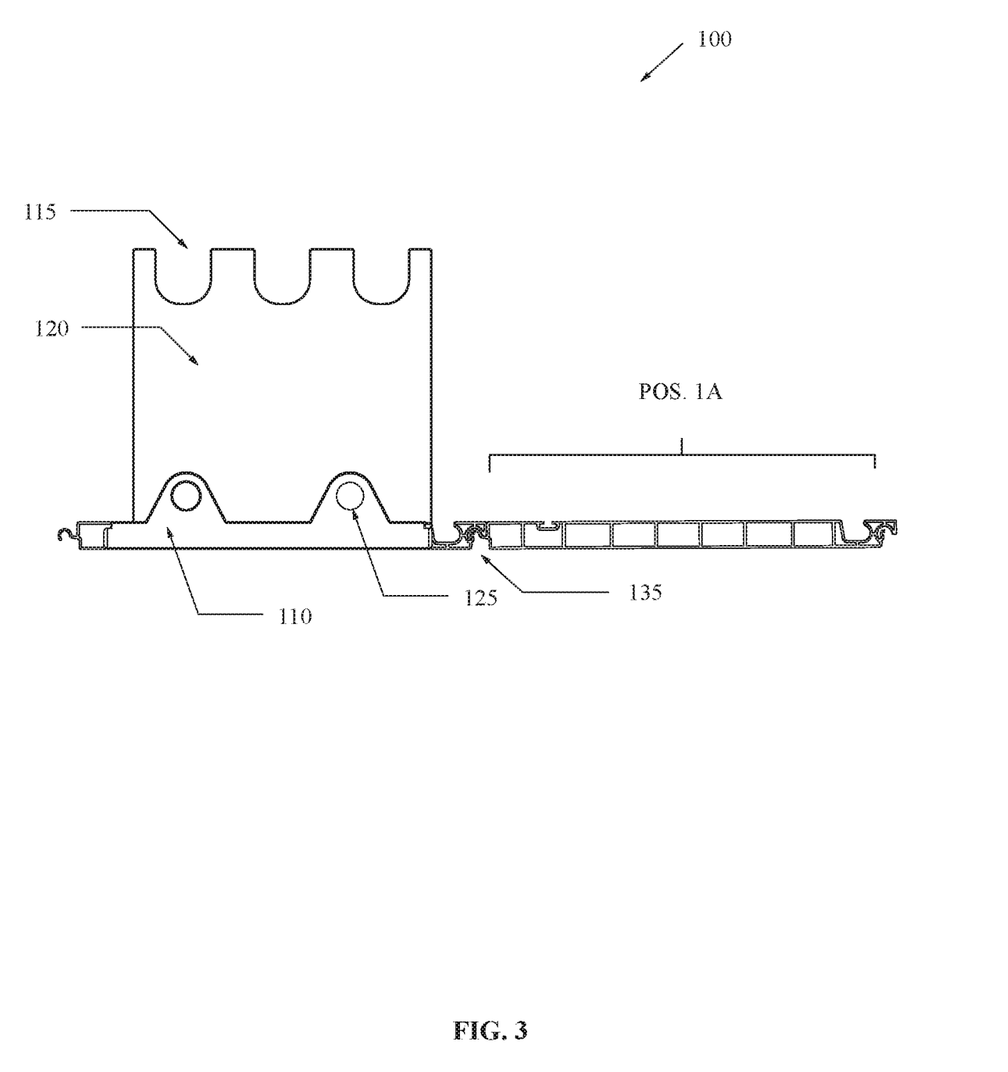
FIG. 3 shows an exemplary right view of one embodiment of the modular cargo slider.
Figure 4:
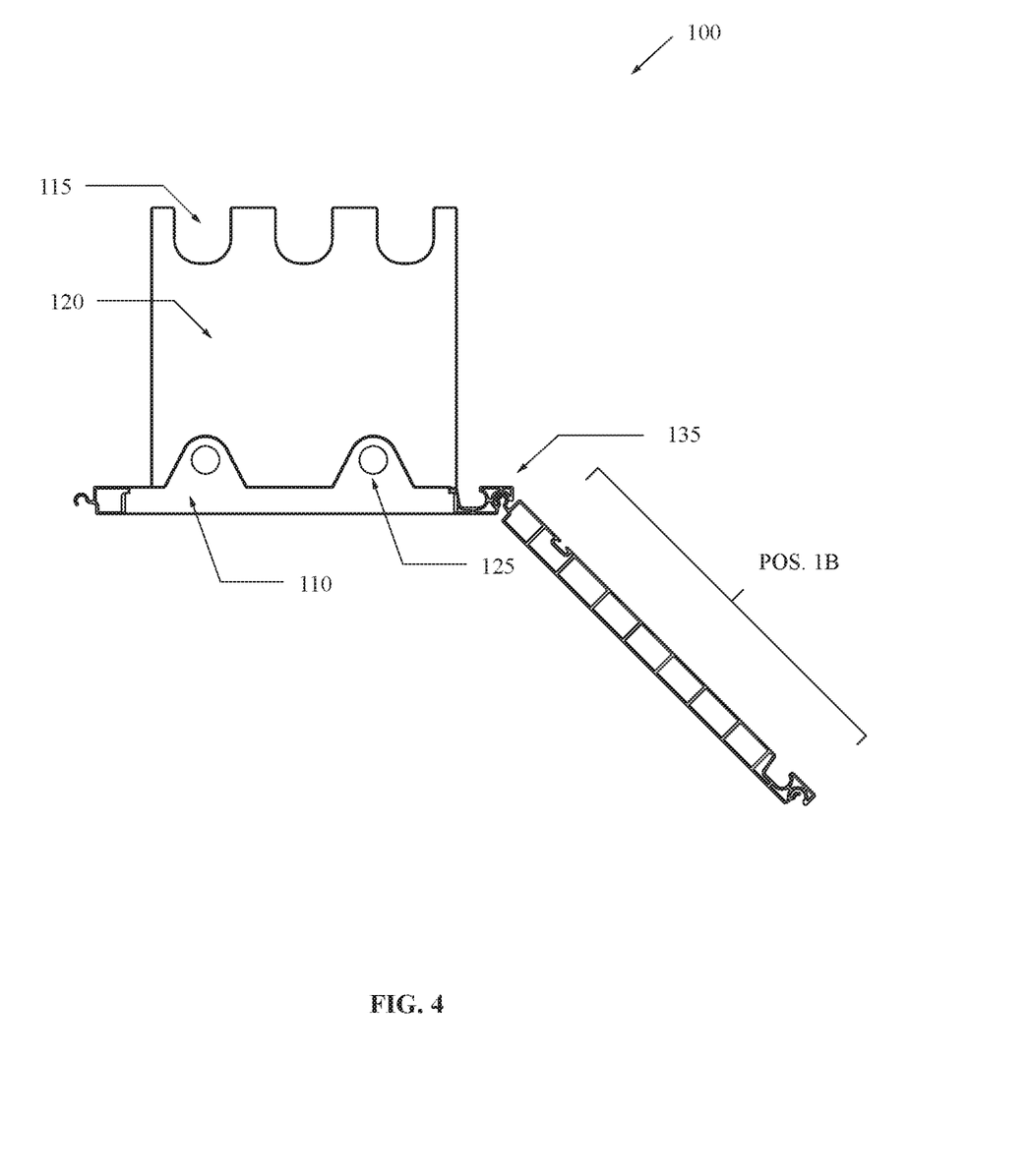
FIG. 4 shows an exemplary right view of one embodiment of the modular cargo slider.
Figure 5:
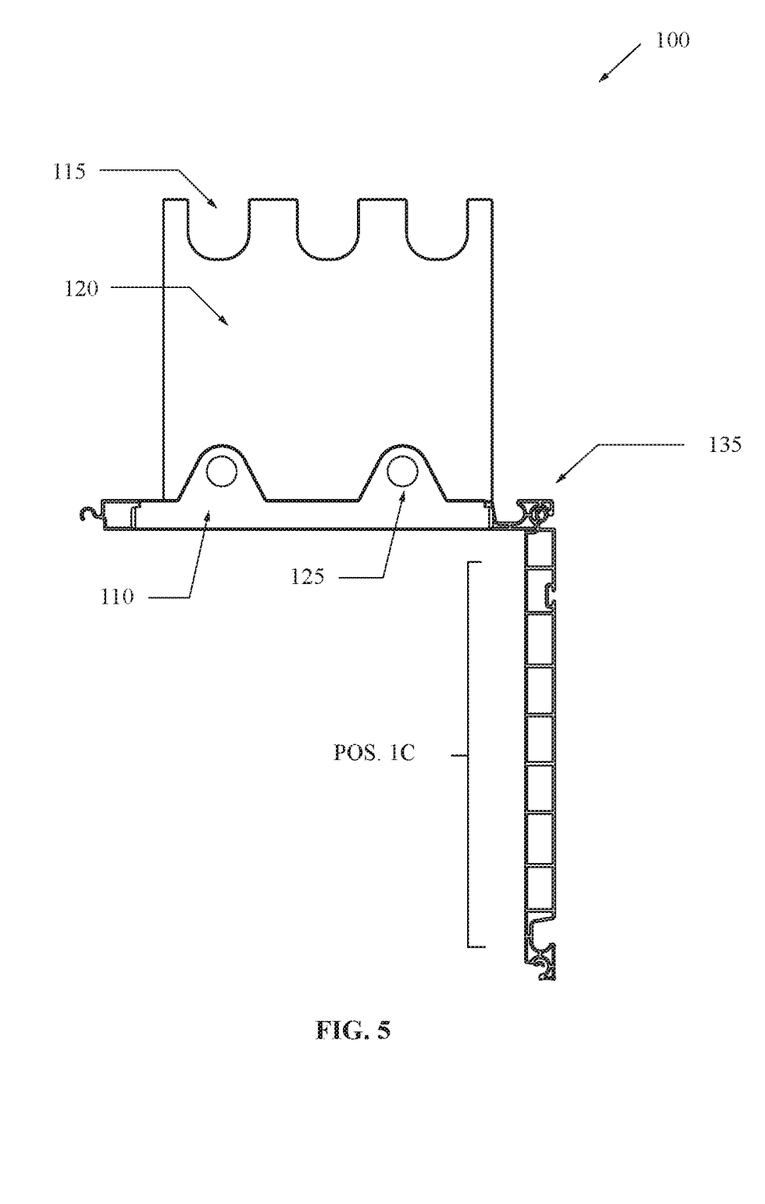
FIG. 5 shows an exemplary right view of one embodiment of the modular cargo slider.

As shown in FIGS. 3, 4, 5, 6A and 6B as the user moves the modular cargo assembly into or outward from the vehicle, in embodiments having more than one platform, each platform rotates about the connection point by means of gravity to move at least one platform out of the way of the user as the user reaches into the vehicle. In exemplary use, the bottom surface of the platform of the modular cargo slider rests in POS. 1A upon a surface of the vehicle (as shown in FIG. 3). As the modular cargo slider is removed from the storage compartment of the vehicle, at least one unit of the platform rotates towards POS. 1B about the connection point by means of gravity (as shown in FIG. 4). Next, as the modular cargo slider is further removed from the storage compartment of the vehicle, at least one unit of the platform rests in POS. 1C in a near vertical position (as shown in FIG. 5).

Figure 9:
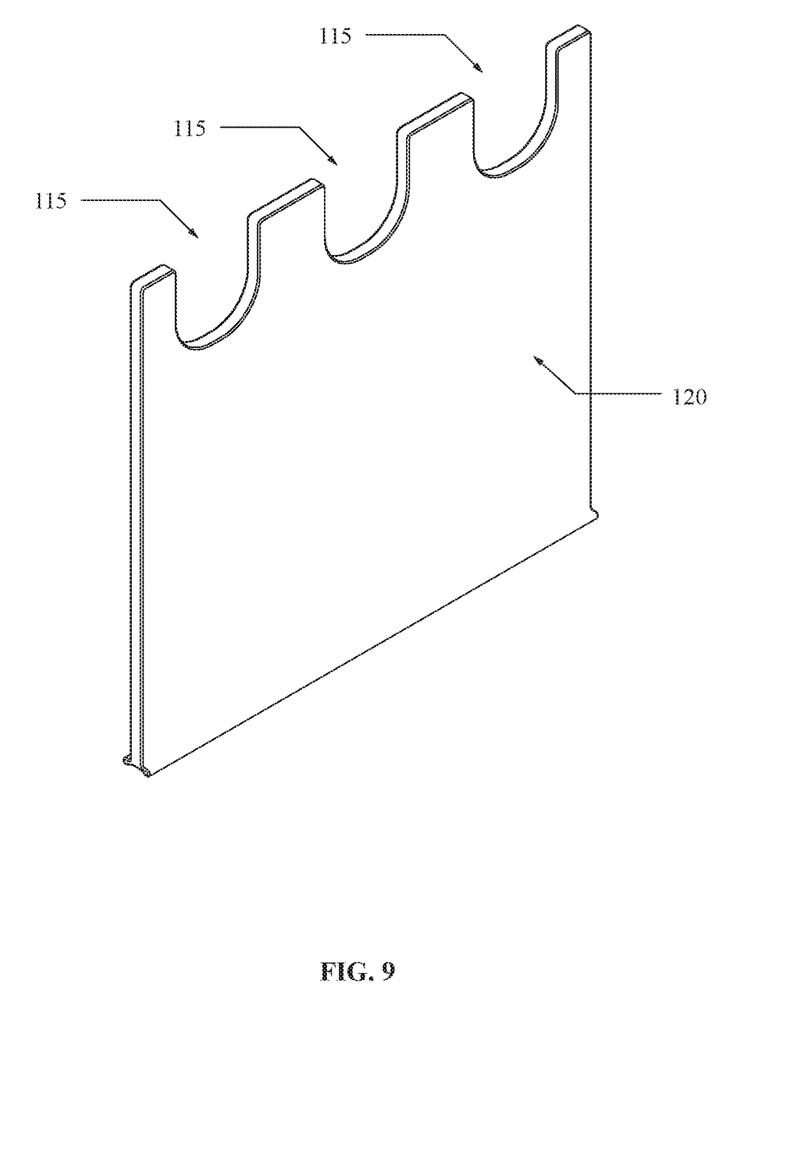
FIG. 9 shows an exemplary isometric view of one embodiment of the divider of the modular cargo slider.

As shown in FIG. 9, the cargo transported by the modular cargo slider may vary and in some environments a containment means is necessary to retain the cargo on the top surface of the platform. The modular cargo slider can also include a platform slot 155 joined to the top surface of the surface of at least one platform. In one embodiment, the containment means is a divider 120, wherein the divider is configured to join to the at least one platform slot, at least one end cap slot 195, or at least one spacer slot 180. Advantageously, the divider aides in containing the cargo on top surface of the platform. In some embodiments, the modular cargo slider comprises at least one platform slot and/or at least one divider. In some embodiments, the divider can include at least one indentation 115 extending into the divider. For example, at least one indention 115 may be used to secure a grocery bag handle. In some embodiments, the platform slot, the spacer slot, or the end cap slot protrudes into the platform top surface. In other embodiments, the platform top surface further comprises the platform slot 155, the spacer slot 180, or the end cap slot 195 extending above the top surface of the platform and the divider is configured to match the cross-sectional shape of the platform slot 155, the spacer slot 180, or the end cap slot 195. In some embodiments, the modular cargo slider comprises at least one spacer 130. In other embodiments, at least one divider aides in retaining a temperature of the cargo resting on the top surface of the platform. In other embodiments (not shown) at least one divider encloses the cargo resting upon the top surface of the platform.

Figure 8:
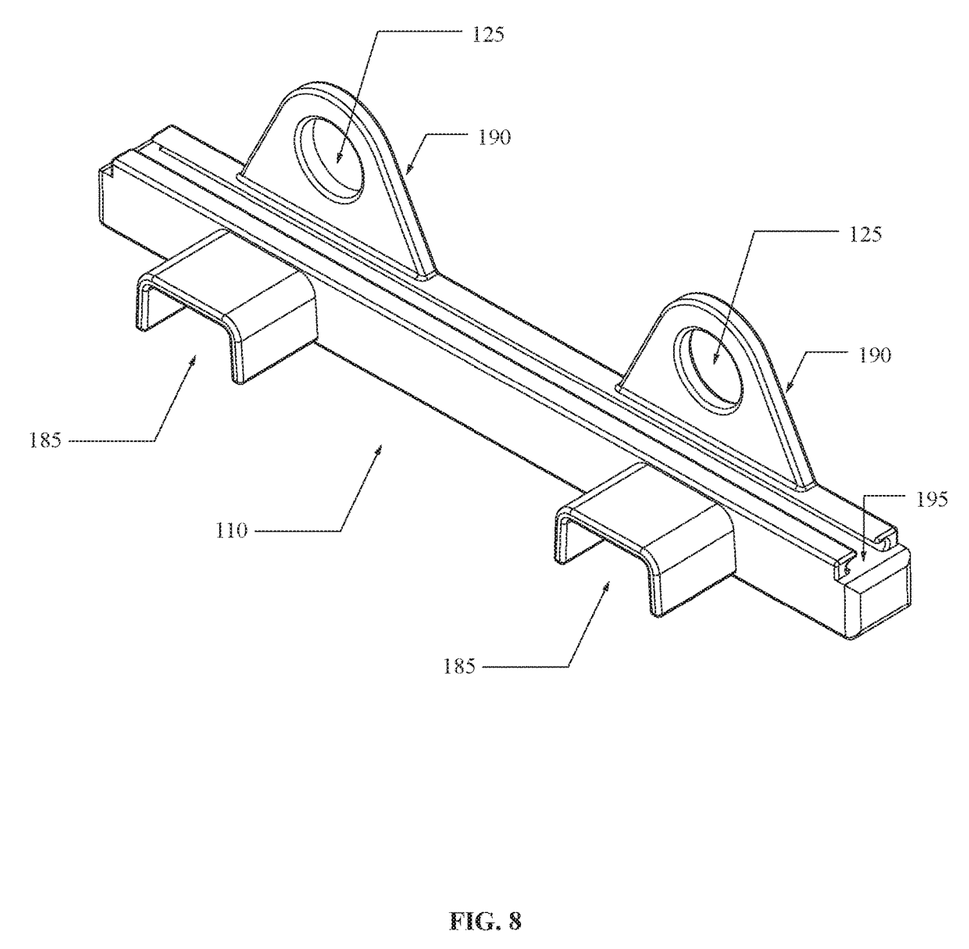
FIG. 8 shows an exemplary isometric view of one embodiment of the end cap of the modular cargo slider.

In some embodiments, the platform is made of a perforated plastic material. In some embodiments, the platform comprises a cavity 160 extending into the platform perimeter edge. In some embodiments, the platform includes multiple cavities. As the user further expands or configures the modular cargo slider, in some embodiments, the modular cargo slider further comprises an end cap 110 having an end cap main body and having at least one end cap protrusion 185 extending away from the end cap main body and configured to be adjoined to the cavity. In some embodiments, the modular cargo slider comprises multiple end caps. In some embodiments, the end cap further comprises at least one end cap slot 195. In some embodiment, the end cap further comprises a tab 190 having at least one opening 125. The at least one opening 125 allowing for the modular cargo slider to be secured to the vehicle.

Figure 7:
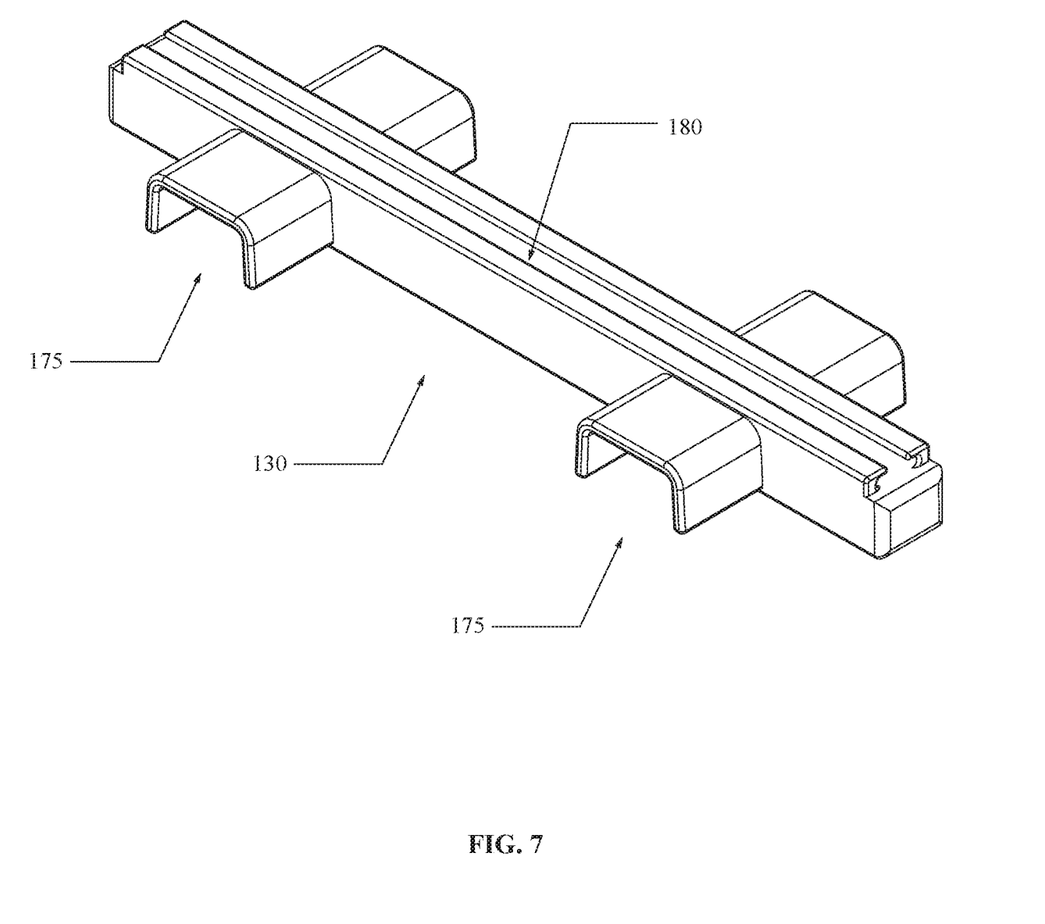
FIG. 7 shows an exemplary isometric view of one embodiment of the spacer of the modular cargo slider.

In some embodiments, the modular cargo slider comprises a spacer 130 having a spacer main body and having at least one spacer protrusion 175 extending away from the spacer main body, wherein the spacer protrusion is configured to be adjoined to the cavity of the platform. In some embodiments, the modular cargo slider comprises at least one of the spacer. In some embodiments, the spacer further comprises at least one spacer slot 180.

In some embodiments, the modular cargo slider further comprises a handle 145 joined to the top surface of the platform. In some embodiments, the modular cargo slider further comprises a handle 145 joined to the perimeter edge of the platform. In some embodiments, the handle protrudes into the top surface or the perimeter edge of the platform. In other embodiments, the handle extends above the top surface or the perimeter edge of the platform. In other embodiments, the modular cargo slider further comprises at least handle configured to be held by at least one finger of a human hand.

In some embodiments, the platform slot, the end cap slot, or the spacer slot may further comprise at least one member of a connection set consisting of: a slot, a rail, a joint, a magnet, an elastic member, a snap-fit, a clamp, a clip, and a fastener.

In other embodiments, the rail and/or the joint of the connection set are chosen from, by way of non-limiting example, a rail set consisting of: a dovetail rail, a tongue and groove joint, a circular hook, a linear guide rail, a dado joint, a rounded slot, and a dovetail joint.

In some embodiments, the platform and/or the divider further comprise an external texture to grip a hand of a human. The external texture may further comprise at least one member of a texture set consisting of: indentations, extrusions, knurling, a rough surface, and bumps. The modular cargo slider in some embodiments may require further identification means. In some embodiments, the modular cargo slider comprises at least one member of an identification set consisting of: an alphanumeric identification, a human user's name, a symbolic shape, a company brand, a numeric identification number, a QR code, a barcode, and an RFID tag. For example, the modular cargo slider may display a symbolic shape representing the cargo to be transported on the top surface of the platform. In another example, the identification set is configured to aid the user in assembling the modular cargo slider in a preferred manner. In another example, a member of the identification set may further aid the user in identifying the destination of the cargo transported on the top surface of the platform while the cargo is loaded or when the vehicle reaches a destination.

In some embodiments, the modular cargo slider is made of at least one member of a material set consisting of: a ceramic material, a metal material, a wood material a plastic material, a fiber glass material, an acrylic material, a composite material, a thermoset plastic, a thermoplastic, a glass material, and a nylon material. Exemplary materials of the material set include, by way of non-limiting example, any other material known to one skilled in the art to have a low coefficient of friction.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A modular cargo slider for moving a cargo within a vehicle, the modular cargo slider comprising:
    a platform having a top surface, a bottom surface, and a perimeter edge, wherein the bottom surface is configured to be positioned upon a surface of the vehicle;
    at least one slot protruding into the top surface of the platform;
    at least one divider, wherein the at least one divider is configured to adjoin to the at least one slot, wherein the at least one divider is configured to contain the cargo on the top surface of the platform and,
    a first connection member joined to the perimeter edge of the platform, wherein the first connection member is configured to rotationally engage with a second connection member of an adjoining platform.

2. The modular cargo slider of claim 1, further comprising:
    at least one cavity extending into the perimeter edge; and,
    at least one end cap having an end cap main body and at least one end cap protrusion extending away from the end cap main body, wherein the at least one end cap protrusion is configured to be adjoined to the at least one cavity.

3. The modular cargo slider of claim 2, further comprising:
    at least one end cap slot protruding into the top surface of the at least one end cap; and,
    at least one divider, wherein the at least one divider is configured to adjoin to the at least one end cap slot, wherein the at least one divider is configured to contain the cargo on the top surface of the platform.

4. The modular cargo slider of claim 1, further comprising:
    at least one cavity extending into the perimeter edge; and
    at least one spacer having a spacer main body and having at least one spacer protrusion extending away from the spacer main body, wherein the at least one spacer protrusion is configured to be adjoined to the at least one cavity.

5. The modular cargo slider of claim 4, wherein the at least one spacer further comprises at least one opening for further attachment of the modular cargo slider to the vehicle.

6. The modular cargo slider of claim 4, further comprising:
    at least one spacer slot protruding into the top surface of the at least one spacer; and,
    at least one divider, wherein the at least one divider is configured to adjoin to the at least one spacer slot, wherein the at least one divider is configured to contain the cargo on the top surface of the platform.

7. The modular cargo slider of claim 1, further comprising at least one handle joined to the top surface.

8. The modular cargo slider of claim 1, wherein the platform further comprises external texture.

9. The modular cargo slider of claim 8, wherein the external texture further comprises at least one member of a texture set consisting of: indentations, extrusions, knurling, a rough surface, and bumps.

10. The modular cargo slider of claim 1, further comprising:
   at least one member of an identification set consisting of: an alphanumeric identification, a human user's name, a symbolic shape, a company brand, a numeric identification number, a QR code, a barcode, and an RFID tag.

11. The modular cargo slider of claim 1, wherein the at least one divider further comprises at least one opening for further attachment of the modular cargo slider to the vehicle.

12. The modular cargo slider of claim 1, wherein the at least one divider further comprises at least one indentation extending into the divider for attachment of the modular cargo slider to the vehicle.

\* \* \* \* \*